(12) United States Patent
Mirfakhraei

(10) Patent No.: US 6,570,912 B1
(45) Date of Patent: May 27, 2003

(54) HYBRID SOFTWARE/HARDWARE DISCRETE MULTI-TONE TRANSCEIVER

(75) Inventor: Khashayar Mirfakhraei, Fremont, CA (US)

(73) Assignee: PCTEL, Inc., Milpitas, CA (US)

( * ) Notice: Subject to any disclaimer, the term of this patent is extended or adjusted under 35 U.S.C. 154(b) by 0 days.

(21) Appl. No.: 09/263,160

(22) Filed: Mar. 5, 1999

(51) Int. Cl.$^7$ ............................. H04B 1/38; H04L 5/16
(52) U.S. Cl. ....................... 375/222; 375/219; 375/220
(58) Field of Search ................................ 375/222, 221, 375/220, 219

(56) References Cited

U.S. PATENT DOCUMENTS

| | | | | |
|---|---|---|---|---|
| 5,636,246 A | * | 6/1997 | Tzannes et al. ............. | 375/221 |
| 6,101,217 A | * | 8/2000 | Gut ............................. | 375/222 |
| 6,112,266 A | * | 8/2000 | Yeh ............................. | 375/222 |
| 6,128,335 A | * | 10/2000 | Liu et al. ..................... | 375/222 |
| 6,279,022 B1 | * | 8/2001 | Miao et al. .................. | 708/404 |

* cited by examiner

Primary Examiner—Don N. Vo
Assistant Examiner—Demetria Williams
(74) Attorney, Agent, or Firm—Pillsbury Winthrop LLP

(57) ABSTRACT

A hybrid modem or transceiver includes communication hardware that transforms time domain samples of a received signal to frequency domain information. The communication hardware transfers the frequency domain information to a host computer which executes receiver software to process the frequency domain information and extract data. The host computer also executes transmitter software to determine frequency domain information corresponding to a transmitted signal. The transmitter software transfers that frequency domain information to the communication hardware which converts the frequency domain information to time domain samples of the transmitted signal. Typically, the hybrid modem or transceiver includes processing hardware for Fourier transforms and inverse Fourier transforms that convert information between the time and frequency domains. This reduces the processing burden on the host computer when compared to conventional software modems or transceivers, but does not have the high hardware costs associated with conventional hardware modems and transceivers.

21 Claims, 3 Drawing Sheets

HYBRID SOFTWARE/HARDWARE DISCRETE MULTI-TONE TRANSCEIVER

CROSS REFERENCE TO RELATED APPLICATION

This patent document is related to an incorporates by reference in its entirety co-owned U.S. patent application Ser. No. 09/240,981, entitled "Host Signal Processing Modem with a Signal Processing Accelerator."

BACKGROUND

1. Field of the Invention

This invention relates to communication systems such as modems or transceivers and particularly to a hybrid modem or transceiver that modulates and/or demodulates a discrete multi-tone communication signal using both dedicated processing hardware and software executed by a host computer.

2. Description of Related Art

Emerging communication standards widely use multi-carrier modulation such as discrete multi-tone (DMT) modulation. For example, the ITU, ANSI, and ETSI have promulgated communication standards such as ADSL (Asymmetric Digital Subscriber Loop) or G.992.1 (G.dmt), and light rate ADSL or G.992.2 (G.lite), HDSL (High bit rate Digital Subscriber Loop), and VDSL (Very fast asymmetric Digital Subscriber Loop). Transceivers implementing these standards are sometimes referred to herein as xDSL transceivers. An article by J. C. Cioffi, entitled "A Multi-Carrier Primer", ANSI T1E1.4/97-157, Boca Raton, Fla., pp. 91–157, November 1991, further describes examples of multi-carrier modulation methods and is hereby incorporated by reference in its entirety.

The xDSL transceivers and multi-carrier protocols use communication signals having a large bandwidth on copper wires (telephone lines) to deliver high data rates when compared to ISDN or voice band modems. The long copper wires between regional central offices and homes drastically attenuate the high-frequency components of the communication signals relative to the low-frequency components which complicates equalization of frequency components in large bandwidth signals received on telephone lines. This is one reason that traditional Quadrature Amplitude Modulation (QAM), used in V.32 and V.34 modems, or Pulse Amplitude Modulation (PAM), used in V.90 and ISDN, are not optimum modulation techniques for emerging large bandwidths communication protocols for copper wire. Instead, DMT modulation is the modulation of choice for various flavors of DSL (copper wire) data communications protocols. With DMT modulation, the channel (full bandwidth) is broken up in to a series of N smaller sub-channels, typically 4 kHz in width. The attenuation within each sub-channel remains fairly constant, which facilitates equalization of the sub-channel. Accordingly, independent QAM processes can modulate data for transmission in parallel through the sub-channels. Since each sub-channel is independently modulated, the transport capacity of each sub-channel can be evaluated before assigning the appropriate information loads. This more effectively utilizes the full channel's capacity and reduces the receiver's processing burden.

QAM modulation of a sub-channel consists of assigning a two-dimensional symbol that is a member of a symbol set (or constellation). The two dimensions indicate the magnitude and phase of a signal (or equivalently the magnitudes of cosine and sine signals) having the frequency assigned to the sub-channel. The number of symbols in each symbol set depends on the number of bits of information assigned to each symbol in the symbol set. In turn, the number of bits per symbol for a sub-channel can be selected according to the capacity or impairment of the sub-channel on the transmission lines. A sub-channel with a high capacity is assigned a larger symbol set (i.e., more bits per symbol) to carry more information. Selecting a symbol for each sub-channel loads the N sub-channels, and then an Inverse Discrete Fourier Transform (IDFT) bundles the symbols into a time domain digital signal, called a DMT symbol. A digital-to-analog converter (DAC) converts the digital signal to an analog signal, and an amplifier (or line driver) boosts the analog signal for transmission via copper wires.

At the receiver, a Discrete Fourier Transform (DFT) decomposes the time domain signal into independent frequency coefficients. The magnitude and phase of each frequency coefficient indicate a QAM symbol for a corresponding sub-channel. The QAM symbols are independently extracted through equalization and slicing or quantization. For the demodulation, the receiver must know the constellation or number of bits per symbol for each sub-channel to covert each QAM symbol to data bits. After the converting the QAM symbols into their corresponding bits, the receiver assembles the bits by a parallel to serial conversion to properly order the transmitted series of bits.

The higher data rates of xDSL transceivers come at the expense of higher processing burdens. Accordingly, conventional implementations of xDSL transceivers are relatively expensive because of the amount or complexity of hardware required for the digital processing that performs modulation and demodulation. Software or host signal processing (HSP) modems eliminate the processing hardware in modems and instead use the processing power of a host computer. Accordingly, HSP modems can be much less expensive than hardware modems. However, for xDSL transceivers, the processing burden on the host processor is heavy so that execution of transceiver software significantly slows the host computer's execution of other applications such as a browser that uses data from the transceiver. An xDSL transceiver is sought that avoids the high costs of conventional hardware transceivers without overly burdening a host processor.

SUMMARY

In accordance with the invention, a hybrid modem or transceiver includes communication hardware that transforms time domain samples of a received signal to frequency domain coefficients. The communication hardware transfers the frequency domain coefficients to a host computer which executes receiver software to process the frequency domain coefficients to decode a received signal and extract data. The host computer also executes transmitter software to determine frequency domain information corresponding to a transmitted signal. The transmitter software transfers the frequency domain information to the communication hardware which converts the frequency domain information to time domain samples of the transmitted signal. The communication hardware, which performs discrete Fourier transforms and inverse discrete Fourier transform that convert information between the time and frequency domains, reduces the processing burden on the host computer when compared to conventional software transceivers but does not have the high hardware costs associated with conventional hardware transceivers.

In accordance with one embodiment of the invention, a hybrid transceiver includes receiver hardware coupled to receive time domain samples of a received signal from the communication channel such as can be established on conducting telephone lines. The receiver hardware transforms the samples to generate frequency domain information for a portion of the received signal and transfers the frequency domain information to a host computer for further processing. For example, when the received signal is in compliance with a discrete multi-tone (DMT) protocol, the receiver hardware partially decodes the received signal by determining Fourier coefficients corresponding to sub-channels defined by the DMT protocol, and a program executed by the host computer completes decoding of the received signal. Additional hardware for the hybrid transceiver typically includes transmitter hardware coupled to receive from the host computer, frequency domain coefficients of a transmitted signal. The transmitter hardware transforms the frequency domain coefficients of the transmitted signal to time domain samples of the transmitted signal.

Communication software in the hybrid transceiver includes the procedure that the host computer executes to complete decoding of the received signal. The communication software also partially encodes the transmitted signal by converting data to be transmitted into the frequency domain coefficients or information for the transmitted signal. The communication software sends frequency domain information to the transmitter hardware which converts the frequency domain information to the time domain.

In one embodiment, the receiver hardware includes a fast Fourier transform engine that converts a set of time domain samples corresponding to a DMT symbol to a set of frequency domain coefficients corresponding to the DMT symbol. Each coefficient corresponds to a sub-channel defined by a DMT protocol. The receiver hardware may further include an equalizer that performs a filter operation on the time domain samples before the conversion from the time domain to the frequency domain.

In one embodiment of the software, a receiver portion of the transceiver software implements a slicer, a deframer, and a decoder, and a higher layer (network layer) protocol interface. The slicer compares each frequency domain coefficient to a constellation for a sub-channel corresponding to the coefficient and identifies a symbol in the constellation. The deframer converts each symbol that the slicer identifies to a set of bits corresponding to the symbol and orders the sets of bits to form a data stream. The decoder performs error detection and error correction on the data stream. The higher layer protocol interface implements a protocol such ATM or STM for transferring data to and from the hybrid transceiver. To further reduce the processing burden on the host computer, alternative embodiments of the invention implement the slicer or other portions of the transceiver software in hardware. An optimal division between transceiver hardware and software depends on the power of the host processor and the complexity of the protocols implemented.

An embodiment of the transmitter hardware includes a command interpreter and inverse Fourier transform engine. The command interpreter interprets software commands for operation of the inverse Fourier transform engine and an interface to the communication channel. To reduce gate count and simplify operation, the inverse Fourier transform engine may implement an inverse discrete Fourier transform rather than an inverse fast Fourier transform.

In one embodiment of the transceiver software, a transmitter portion of the transceiver software includes an error correction encoder, a framer, a constellation encoder, and a scaler. The error correction encoder attaches redundant bits to the data to generate an input bit stream that would enable a receiver to detect and correct the original data bits when channel anomalies corrupt the data. The framer separates the input bit stream into sets of bits that are assigned to the sub-channels according to the implemented DMT protocol and the allowed loading of each sub-channel. The constellation encoder identifies a symbol corresponding to each bit set, this may involve adding more redundant bits to each set to improve the noise immunity of the data (trellis encoding), and the scaler scales the symbols according to the properties of the communication channel. As with the receiver software, alternative embodiments of the hybrid transceiver implement processing blocks such as the scaler and the constellation encoder in hardware to reduce the burden on the host processor.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, a hybrid modem or transceiver uses software that a host processor in a host computer executes to perform some but not all of the processing required for modulation and/or demodulation of a communication signal. The hybrid transceiver also includes dedicated processing hardware that performs other processing required for the modulation and/or demodulation of the communication signal. The dedicated hardware reduces the processing burden on the host processor and thereby lets less powerful host computers implement the hybrid transceiver for communication protocols employing discrete multi-tone (DMT) modulation. In one embodiment, the dedicated hardware is an accelerator that implements Fourier transforms or inverse Fourier transforms which are common to DMT modulation protocols. Use of the host processor to execute transceiver functions reduces the amount of dedicated transceiver hardware and thereby reduces the expense of the hybrid transceiver when compared to conventional hardware transceivers. Use of host executed transceiver software also simplifies the adaptation of the hybrid transceiver to new protocols.

Figure 1:
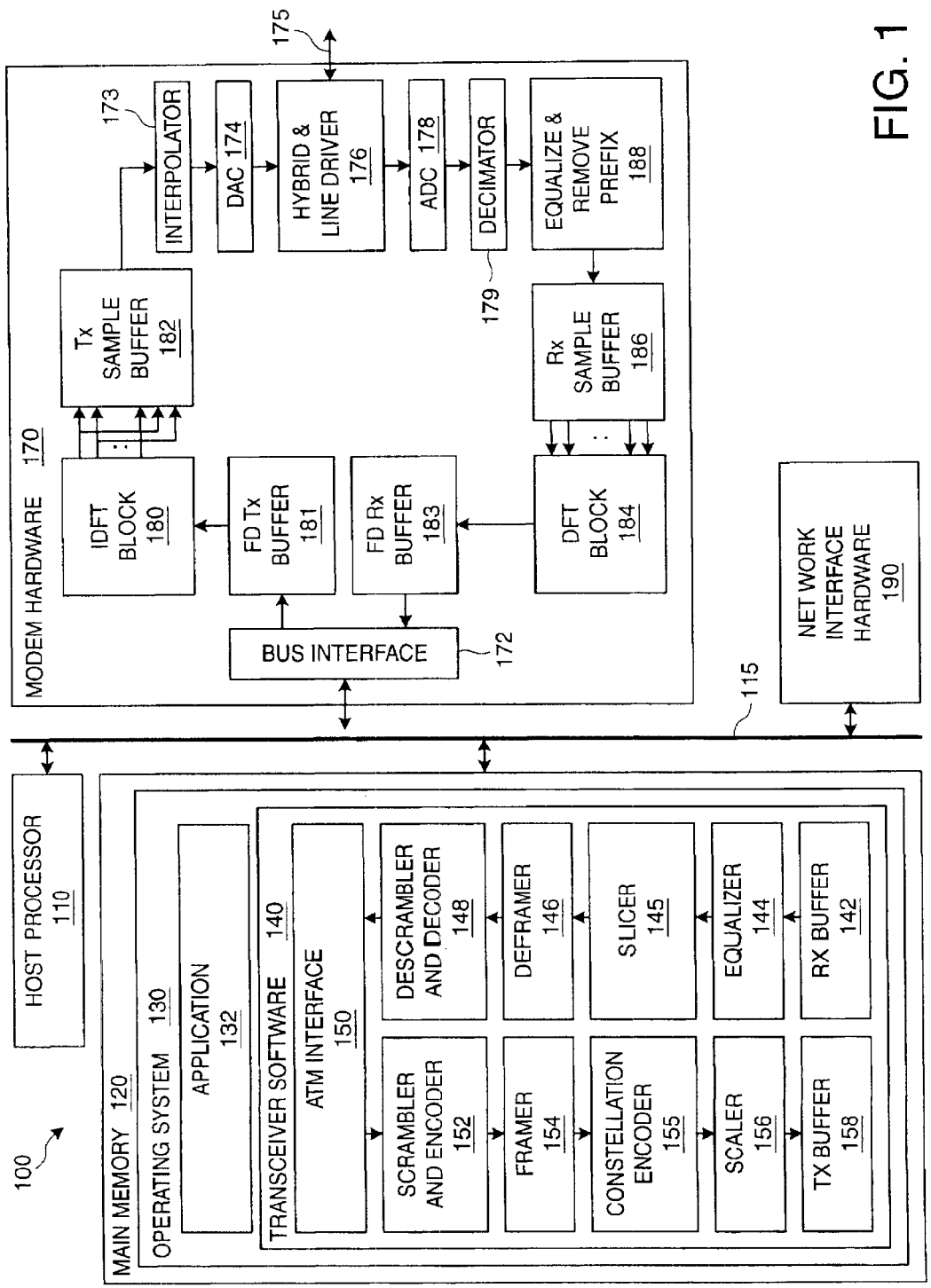
FIG. 1 is a block diagram of a hybrid transceiver that in accordance with an embodiment of the invention, uses a combination of hardware and software to implement a multi-carrier protocol.

FIG. 1 illustrates a computer system 100 including a hybrid transceiver in accordance with an embodiment of the invention. Computer system 100 includes a host processor 110 such as a x86 processor (e.g., a PENTIMUM or K6 microprocessor) and a main memory 120 which are coupled to a device bus 115. Device bus 115 may be, for example, a PCI or USB bus to which hardware devices 170 and 190 connect. Main memory 120 couples to device bus 115 to permit direct memory accesses (DMAs) or similar transfers between main memory 120 and the devices on device bus 115. Although illustrated simply in FIG. 1, computer architectures including host processors, main memories, and device buses are well known in the art, and embodiments of the invention can be employed in any such computer architectures.

In operation of computer system 100, memory 120 includes software that host processor 110 executes. The software typically includes an operating system 130 (e.g., Windows 98, NT, CE) that supervises execution of one or more applications 132 and resources such as drivers for devices 170 and 190 coupled to device bus 115. In FIG. 1, transceiver software 140 includes a driver for transceiver hardware 170, but alternatively transceiver software 140 can be implemented as an application or another software structure.

In accordance with an aspect of the invention, computer system 100 implements a hybrid transceiver in which both transceiver software 140 and transceiver hardware 170 include functional blocks that perform portions of the modulation or demodulation procedures required under a DMT modulation protocol such as G.992.2 or G.992.1. The following describes decoding and encoding according to the G.992.2 protocol as an illustrative example of the operation of the hybrid transceiver. However, the hybrid transceiver is not limited to G.992.2 or any other specific protocol including but not limited to DMT modulation protocols.

As a receiver decoding a communication signal including multiple sub-channels carrying data, transceiver hardware 170 receives the communication signal via telephone lines 175. A conventional analog front end circuit 176 passes the received signal from telephone line 175 to an analog-to-digital converter (ADC) 178 which converts the received analog signal 178 into a series of digital samples. An optional decimator 179 decimates the series of digital samples if it is necessary to control the sample rate to a time domain equalizer. Time domain equalizer 188 performs an FIR or IIR filter operation on the digital samples from ADC 178 to partly compensate for channel impairment. In accordance with the G.992.1 (G.dmt) and G.992.2 (G.lite) or T1.413 (ANSI g.dmt), a DMT symbol corresponds to a portion of the analog signal that has a fixed duration (or number of samples) and includes a prefix that is repeated at the end portion of the DMT symbol. For G.992.2 and similar protocols, the prefix is typically removed after equalization to leave a series of a fixed length that corresponds to a DMT symbol, for example, 256 samples for the DMT symbol of the G.992.2 protocol.

A sample buffer 186 collects the samples in the series representing a DMT symbol and provides the samples to a DFT block 184. DFT block 184, which performs a Discrete Fourier Transform (DFT) on the samples, is a hardware processing block that may be implemented as a dedicated digital signal processor executing software or firmware. In one embodiment, DFT block 184 is a portion of an accelerator described further below. Other systems for performing discrete Fourier transforms, including Fast Fourier Transforms (FFTs), are well known in the art. DFT block 184 outputs a set of Fourier transform coefficients as complex values that contain magnitude and phase information for the sub-channels carrying data on telephone lines 175. A G.992.2 communication signal has 128 sub-channels of width 4 kHz with 32 sub-channels for data transmitted from the user and 96 sub-channels for data received from the central office. DFT block 184 may generate only the Fourier coefficients for the sub-channels carrying received information.

A frequency domain Rx buffer 183 stores the frequency domain results from the Fourier transform until the results are transferred via a bus interface 172 to an Rx buffer 142 in main memory 120 of computer system 100. Transfers from buffer 183 can be via DMA or similar transfers that are conducted without the supervision of host processor 110. Alternatively, host processor 110 can execute an interrupt routine that retrieves frequency domain data (e.g., Fourier coefficients) from buffer 183 when required for further processing by transceiver software 140.

In transceiver software 140, an equalizer 144 is a frequency domain equalizer that further adjusts the Fourier transform results to compensate for intersymbol interference. In one embodiment, equalizer 144 is an N-tap FIR adaptive filter where N is equal to the total number of downstream sub-channels or the number of sub-channels used for the received signal. A slicer 145 matches the results from equalizer 144 to symbols in the constellations for the sub-channels, so that slicer 145 outputs a series of symbols. A deframer 146 converts each symbol into a set of bits and orders the sets of bits in the order the DMT protocol defines for reconstructing a bit stream. FEC decoder 148 detects and corrects some bit errors in the bit stream and descrambles the corrected bit stream. A CRC circular redundancy check block in decoder 148 checks the bit stream for any errors but has no correcting capabilities to correct or detect errors in the bit stream. The FEC decoding, descrambling, and CRC checks decoder 148 implements depend on the protocol for the communication signal. For example, for the G.992.2 standard, decoder 148 undoes data interleaving according to the standard. For the G.992.1 standard, which provides alternate encoding paths, one with data interleaving and one without data interleaving, decoder 148 undoes the interleaving for portions of the signal that were interleaved during encoding and recognizes portions of the signal that were not interleaved during encoding.

A user receives the resulting decoded data from decoder 148 via hardware and software interfaces. In the embodiment of FIG. 1, a software ATM interface 150 implements an asynchronous transfer mode communication interface accessible through operating system 130. Software interface 150 implements both an ATM layer and a transmit convergence (TC) layer of the established ATM protocols so that device 170 does not require a hardware ATM interface. Application 132, for example, receives the data from transceiver software 140 via appropriate calls to a procedure such as NDIS in the WINDOWS operating system. Since ATM interface 150 is expressly for the hybrid transceiver, maximum data transfer rates for ATM interface 150 can be limited according to the maximum data rate of the communication protocol that the hybrid transceiver implements. Transceiver software 140 may further or alternatively include a software emulation of a UART (not shown) that permits operating system 130 or other software to access and operate the hybrid transceiver in the same manner that a conventional modem having a hardware UART is accessed and operated. Accordingly, modem hardware 170 does not require a hardware UART. U.S. Pat. No. 5,787,305 further describes a communication system including a software UART and is hereby incorporated by reference in its entirety. The user may alternatively reside at another computer coupled to computer system 100 through a local area network. ATM interface 150 and network interface hardware 190, for example, can provide asynchronous transfer mode communication to transfer the data to a user over a local network.

The user also sends data to the hybrid transceiver via ATM interface 150 for transmission to the central office via telephone line 175. In particular, a scrambler and encoder 152 receives the data bit stream from the TC (transmit convergence) block in ATM interface 150. Encoder 152 scrambles and encodes the data bits according to the communication protocol including, for example, adding code bits such as circular redundancy check bits and forward error correction codes and interleaving data if required by the protocol. From encoder 152, a framer 154 breaks the bit stream into symbol-sized bit sets for transmission on the sub-channels and assigns the bit sets to sub-channels in the order the protocol defines. The number of bits in each bit set depends on the number of bits per symbol in the sub-channel assigned to the bit set. A constellation encoder 155 assigns a symbol value to each bit set, and a scaler 156 scales (i.e., changes the magnitude) of the symbol values to compensate for channel impairment in the sub-channels. A collection of the scaled symbols that includes one scaled symbol for each sub-channel is a DMT symbol. A transmit buffer 158 stores the DMT symbols for transfer to transceiver hardware 170 for further processing.

Transceiver hardware 170 receives DMT symbols via bus interface 172 and stores the symbols in a Tx buffer 181 for frequency domain information. An IDFT block 180 performs an inverse discrete Fourier transform (IDFT) on a DMT symbol to generate a set of time domain samples for the transmitted signal. A sample buffer 182 collects the time domain samples and serially provides the samples through an optional interpolator 173 to a digital-to-analog converter (DAC) 174. To provide a prefix having redundancy with an end portion of the transmitted signal, some of the samples from the beginning of the time ordered series for a DMT symbol are repeated at the end of the series. Transceiver hardware 170 serially processes DMT symbols so that DAC 174 generates a continuous analog communication signal. A line driver in circuit 176 amplifies the analog signal for transmission on telephone line 175.

Figure 2:
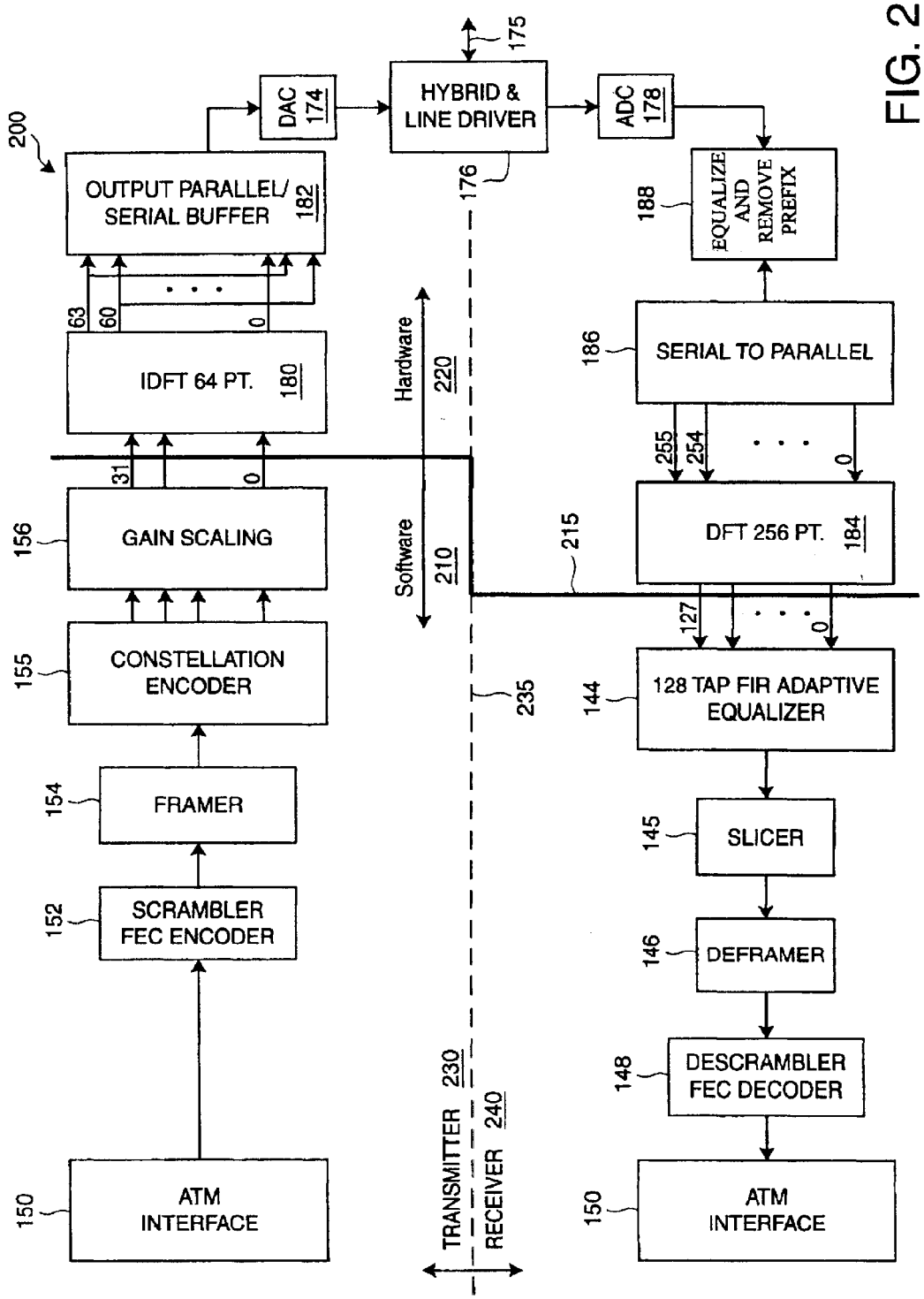
FIG. 2 is a block diagram illustrating dividing lines between hardware and software portions and between receiver and transmitter portions of a hybrid transceiver in accordance with an embodiment of the invention.

FIG. 2 illustrates a division of processing tasks between transceiver hardware 220 and transceiver software 210 in a hybrid transceiver 200 in accordance with the invention. Transceiver hardware 220 is to the right of a hardware/software 'boundary' line 215. An exemplary implementation of transceiver hardware 220 includes an ASIC implementing processing blocks 180, 182, 184, 186, and 188; an analog front end IC containing DAC 174 and ADC 178; and hybrid and line driver circuit 176 that connects to telephone lines 175. Transceiver software 210 is to the left of line 215 and includes software blocks 144, 145, 146, 148, 150, 152, 154, 155, and 156 which the processor of the host computer executes. Hybrid transceiver 200 can also be divided into a transmitter 230 and a receiver 240. Transmitter 230, which is above a line 235, includes software blocks 150, 152, 154, 155, and 156 and hardware blocks 180, 182, and 174. Receiver 240, which is below a line 235, includes hardware blocks 178, 188, 186, and 184 and software blocks 144, 145, 146, 148, and 150. Transmitter 230 and receiver 240 share the analog front end circuit and ATM interface 150.

In alternative embodiments of the invention, hardware/software 'boundary' line 215 can be between any two functional blocks in transmitter 230 and any two functional blocks in receiver 240. For example, asymmetric digital subscriber loop protocols normally have fewer sub-channels for transmissions from the user to the telephone company central office. Thus, the processing burden on the host computer for encoding user data for transmission is significantly less than the processing burden for decoding all of the received sub-channels. Accordingly, transceiver software 210 can implement IDTF block 180 and/or the parallel to serial conversions without unduly burdening the host processor. In this case, instead of transferring frequency domain symbols from software section 210 to hardware section 220, time-domain samples or other data are transferred. Also, transceiver hardware 220 can implement functional blocks such as frequency domain equalizer 144 or slicer 145 and still reduce the total amount of dedicated transceiver hardware when compared to conventional hardware transceivers. Moving line 215 typically trades increasing the burden on the host processor for decreasing the amount of transceiver hardware 220. The ideal configuration depends on the communication protocol implemented and the processing power available from the host processor.

Generally, the type and amount of information transferred between transceiver software 210 and hardware 220 changes according to the selection of the location of hardware/software 'boundary' line 215. Transceiver 200 conducts the flow of information between transceiver hardware 220 and transceiver software 210 via the host computer's device bus (e.g., a PCI or USB bus), which provides a data path for external devices, specifically transceiver hardware 220 of hybrid transceiver 200. The transfer of data between hardware 220 and software 210 can be seamless, for example, by a Direct Memory Access (DMA) that does not interrupt the host processor's normal operation. Alternatively, an interrupt routine can periodically transfer data blocks between buffers in the host computer and buffers in transceiver hardware 220. Data typically waits in the host computer's memory (e.g., in the motherboard's memory module) until the host processor is ready to process the data. Transceiver hardware 220 or another mechanism periodically interrupts the host processor causing the host processor to execute blocks of transceiver software 210. Often, the operating system of the host computer limits the duration and frequency of the interrupts for execution of transceiver software 210.

Three major contributions to the delay associated with the hybrid transceiver are: the inherent delay in hardware and software implementations of the functional blocks of FIG. 2; the delay in transfer of information at the software/hardware line 215, which is due to the data bus latency, for example; and delay caused by the operating system's constraints on the frequency and duration of interruptions of the host processor. The delay limits the time available for the host processor to execute the functions of transceiver software 210. In practical situations, constraints on the frequency and duration of the interrupts have the greatest effects (on the order of tens of milliseconds) and hence the total delay is constrained by the processor interruption latency. The delay may impact services (e.g., voice services, real time video services, or interactive services) that the data communication provides.

MIPS considerations are the primary factor in determining which processing blocks of transceiver 200 or another hybrid communication system are implement in hardware. In particular, the amount of hardware increases to lower the processing burden on host processor, and leave the host processor with sufficient MIPS for tasks other than executing transceiver software. Another factor is power savings. For example, tones from a remote transceiver must be detected before attempting a connection between transceiver 200 and the remote transceiver, and received tones wake transceiver 200 from a sleep mode. U.S. patent application Ser. No. 09/170,687, entitled "Wake Up-On-Ring Power Conservation for Host Signal Processing Communication System", which is hereby incorporated by reference in its entirety, describes a communication system that allows a host processor to enter a sleep mode to save power and uses hardware that upon detecting a ring signal wakes up the host processor. If tone detection blocks are implemented in software, the host processor has to always be alert for any tone that might be received, whereas if tone detection is in hardware, the host can enter sleep mode (to save power) and only supply the hardware enough power to keep monitoring for tones.

Figure 3:
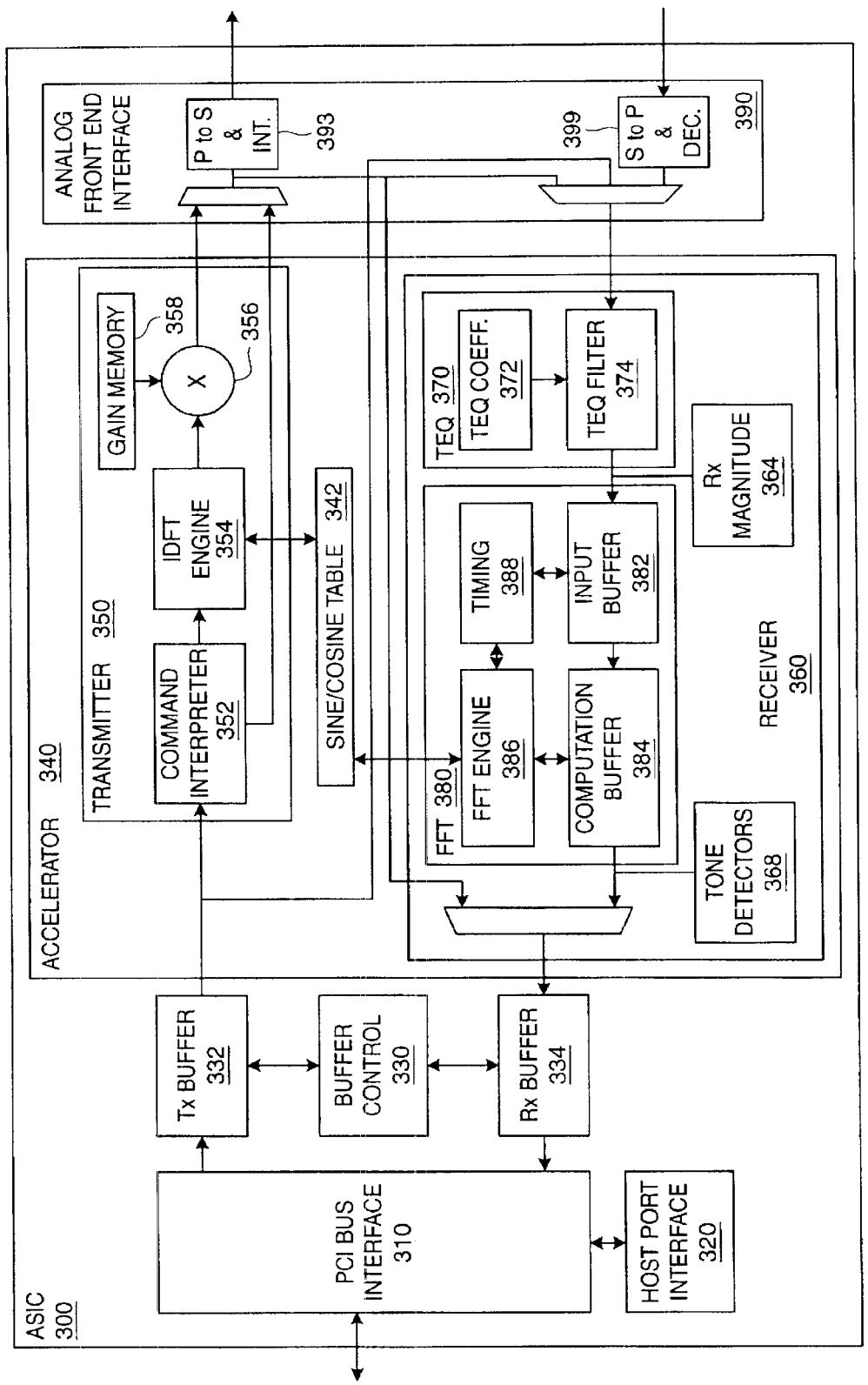
FIG. 3 is a block diagram of an ASIC implementing hardware portions of a hybrid transceiver in accordance with an embodiment of the invention.

FIG. 3 is a block diagram of an exemplary embodiment of an ASIC 300 that implements major hardware functions in a hybrid transceiver complying with the G.992.2 standard. ASIC 300 may also include hardware (not shown) for a software modem implementing the V.90 standard or other modem standards. For connection to a host computer, ASIC 300 contains a PCI bus interface 310 and a host port interface 320. PCI bus interface 310 is a standard 32-bit, 33-MHz PCI local bus interface for connection to a PCI bus in a host computer. Interface 310 interprets and generates the PCI bus signals defined in the PCI bus standard. Host port interface 320 includes configuration registers for ASIC 300 that the host computer and transceiver software accesses through the PCI bus and PCI bus interface 310.

ASIC 300 contains a buffer circuit 330, an accelerator 340 that does part of the processing according to the G.992.2 standard, and an interface 390 for an analog front end (AFE) circuit that connects to telephone lines. Buffer circuit 330 controls a Tx buffer 332 and a Rx buffer 334. For this implementation of a G.992.2 hybrid transceiver, accelerator 340 determines the inverse discrete Fourier transforms of DMT symbols from Tx buffer 332 and Fourier transforms series of time domain samples received via interface 390. Interface 390 has the buffers to accommodate samples coming from and going to the analog front end circuit connected to telephone lines.

Accelerator 340 writes in Rx buffer 344 the frequency domain results from the Fourier transform of received time domain samples corresponding to DMT symbols. Since G.992.2 and other DMT modulation standards are asymmetric between send and receive sub-channels, buffers 342 and 344 have different sizes and may have programmable sizes to accommodate multiple DMT protocols such as G.992.1 in addition to G.992.2. Buffers 332 and 334 serve to match the clock rate of the host (or PCI) bus to the clock rate of ASIC 300, overcome the temporary latencies (up to 1 ms) associated with the PCI bus, and accommodate the bursts of data resulting from the FFTs and IDFTs that accelerator 340 performs. Rx and Tx buffers 332 and 334 are FIFOs or dual port circular buffers with counters that track of the numbers of data words in the buffers. Each port of each buffer 332 and 334 is a read-only or write-only port, and two independent clock signals drive opposite ports. The ports on the PCI side are 32 bits (or two words) wide, and all transactions from PCI bus interface 310 are 32-bit data. The ports of buffers 332 and 334 that are coupled to accelerator 340 are 16 bits (or one word) wide, but the transactions between buffer 330 and accelerator 340 (other than "peeking" into the buffers) are usually in full DMT symbols.

DMA engines in PCI bus interface 310 move data between buffer 332 or 334 and the corresponding buffers in the host's memory. Each of buffers 332 and 334 has an independent DMA channel, and each DMA channel has registers in host interface 320 for information such as a system buffer starting address, a current data pointer, a system buffer size register, and a heart-beat count. Control mechanisms in buffer circuit 330 keep the integrity of buffers 332 and 334; manage exceptions such as over-runs and under-runs; and report the buffer status to the host computer. Such buffer and DMA circuits can be implemented using circuits well known in the art.

Accelerator 340 does the time-domain signal processing and conversion of signals between the time domain and the frequency domain. Accelerator 340 includes a transmitter 350 and a receiver 360. Most of the hardware in transmitter 350 and receiver 360 works at a clock frequency of about 35.328 MHz. This is about 32 times faster than the received sampling rate after decimation and about 128 times faster than the transmit sampling rate. Accordingly, multipliers, adders, shifters, and other hardware in accelerator 340 can be re-used many times during each sampling period. This reduces the amount of circuitry or number of coefficients that accelerator 340 requires.

In an exemplary embodiment, accelerator 340 use a fractional format for values in calculations. In the fractional format, negatives are twos complements, and the binary point is between the most significant bit and the rest of the bits. Accordingly, fractional values are between $-1$ and $+1-2^{-n}$ where n is the number of bits. When multiplying a positive M-bit fractional value by and a positive N-bit fractional value, a 1-bit shift to the left is required to make the product fractional again. The product can be represented with only M+N−1 bits if at least one of the multiplicands is not −1. If both multiplicands are −1, the product is 1, which is not a fractional value according to the above definition. To keep all values fractional, filter coefficients in a memory 372 and gains in a memory 358 are not allowed to be −1, and when clipping of a negative value, the value is clipped to $-1+2^{-n}$ rather than −1.

Transmitter 350 includes a command interpreter 352 and an IDFT engine 354. Command interpreter 352 connects to Tx buffer 332, handles requests for data from IDFT engine 354, and communicates with interface 390 according to commands in buffer 332. Tx buffer 332 holds blocks corresponding to DMT symbols to be transmitted. The first six words in each such block are reserved for commands. Interpreter 352 checks Tx buffer 332, extracts the commands from Tx buffer 332, and operates according to the extracted commands. Among the commands to interpreter 352 are synchronizing IDFT engine 354 and sending clock adjustments to interface 390 at the correct timing. Synchronizing IDFT engine 354 adjusts the boundaries of the DMT symbol before IDFT engine 354 performs an IDFT operation. Clock adjustment causes the symbol clock of ASIC 300 to follow the remote transceiver's symbol clock. Usually, the first data word of a new DMT symbol block contains all the information command interpreter 352 needs. In some special cases, the following data words contain more command information. Whenever, a data word is command information rather than data, command interpreter 352 replaces that data word with zero data. Command interpreter 352 also receives requests for data from IDFT engine 354 and provides the requested data from buffer 332 to IDFT engine 354.

When checking for commands or supplying data, command interpreter 352 typically peeks into buffer 332 rather than reading the data. The difference peeking and reading is that a "read" cause Tx buffer 332, which operates as a FIFO, to update counters and pointers to purge the data read. A "peek" retrieves the data without making Tx buffer 332 update any counters or pointers. IDFT engine 354 normally requires the same piece of data many times during the duration of a DMT symbol. When peeking into Tx buffer 332, command interpreter 352 provides buffer 332 with an offset from the first word available in buffer 332. After IDFT engine 354 has used the data for the last time, command interpreter 352 "reads" the data which purges the data from buffer 332.

If IDFT engine 354 cannot ignore command words, command interpreter 352 detects this situation and reads the first word without forwarding the command word to IDFT engine 354. The first word still provides the special information to command interpreter 352.

If an under-run condition occurs in buffer 332, command interpreter 352 goes into a passive mode. In passive mode, command interpreter 352 does not synchronize IDFT engine 354, nor does command interpreter 352 generate or send clock adjustments to interface 390. Command interpreter 352 stops interpreting commands since the values from buffer 332 might actually belong to past symbols or be only partly correct. However, command interpreter 352 continues to transfer data to IDFT engine 354. Buffer 332 reports an under-run if buffer 332 contains less than 32 data words when command interpreter 352 attempts a peek. Command interpreter 352 returns to normal mode when buffer 332 clears the under-run condition. When the host places transmitter 350 into a bypass mode, command interpreter 352 is disabled and does not extract, interpret or execute any operations except transfer requests from IDFT engine 354 to Tx buffer 332.

IDFT engine 354 receives frequency domain information from buffer 332 via command interpreter 352, receives sine and cosine information from a look-up table 342, and determines the inverse discrete Fourier transform of the frequency domain information to generate time domain samples. IDFT engine 354 also adds a cyclic prefix to the samples if needed and interpolates between the time domain samples if required to match the output sampling rate.

The last stage of transmitter 350 applies the transmission gain and selects the proper window. More particularly, transmitter 350 includes a multiplier 356, and a memory 358 for Tx gain coefficients. Multiplier 356 multiplies the time-domain samples from IDFT engine 354 by Tx gains stored in memory 358 before transmitter 350 sends the resulting scaled samples to AFE interface 390. When selecting a window, each result is rounded to the nearest least significant bit (LSB) that is represented in the window, and clipped to avoid an overflow. Clipping generally saturates values to $+/-(1-2^{-n})$, avoiding $-1$.

Interface 390 converts the samples to the appropriate format for the analog front end circuit between interface 390 and the telephone lines. In one embodiment of the invention, the analog front end circuit is a monet IC available from Texas Instruments. In this embodiment, interface 390 performs a parallel-to-serial conversion to convert transmitted samples to frames in a serial bit stream for a serial codec, and the sampling rate (about 1.104 M samples per second) for the received signal is higher than the sampling rate (about 276 K samples per second) for the transmit signal. The AFE circuit usually dictates the sampling rates for the transmit and the received signals. For a less flexible (hence cheaper) AFE circuit that has uniform sampling rates (e.g., 2.208 M) for both receive and transmit paths, an interpolator 393 can interpolate the TX samples from 276 K samples per second from transmitter 350 up to 2.208 M samples per second before sending the TX samples to the AFE circuit. Similarly, a decimator 399 can decimate the RX samples from 2.208 M samples per second from the AFE circuit to 1.104 M samples per second before receiver 360 processes the samples.

Receiver 360 includes a time-domain equalizer (TEQ) 370, a Rx magnitude block 364, a fast Fourier transform (FFT) block 380, and tone detectors 368. Receiver 360 receives the RX time domain samples from interface 390. In the embodiment of FIG. 3, the effective sampling rate, after decimation, is such that 256 samples (or 272 if a prefix is included) correspond to a DMT symbol. TEQ 370 implements a 16-tap filter of time domain samples. TEQ 370 is post-cursor only with the main coefficient being the first coefficient, i.e., the coefficient that multiplies the most recent sample. TEQ 370 includes filter hardware 374 and memory 372 for the filter coefficients. The major sub-blocks of filter hardware 374 are a 16×16-bit multiplier and an accumulator. The multiplier serially performs sixteen multiplications per sample. Each multiplication determines the product of a 16-bit TEQ coefficient from memory 372 and a 14-bit sample. The accumulator sums the products to provide a filtered time-domain sample and is therefore at least 33 bits wide. The host can execute software to change one, some, or all of the TEQ coefficients in memory 372 at any time. However, changing the TEQ coefficients can interfere with operation of TEQ 370 and distort the filter results for the duration of the loading plus sixteen samples after the last coefficient was loaded.

To handle cyclic prefixes of DMT symbols, TEQ 370 also contains a DMT symbol counter (not shown) which is a modulo-256 free running counter. The DMT symbol counter starts at 0 after a reset and increments by one every 256 samples (or every 272 samples if a cyclic prefix mode is enable). Host executed software writes a number to a control register to indicate when TEQ 370 enters the cyclic prefix mode. When the number written matches the count in the DMT symbol counter, TEQ 370 toggles the cyclic prefix mode status, and clears the DMT symbol counter. In the cyclic prefix mode, TEQ 370 does not write the last sixteen of every 272 samples to the input buffer 382 in FFT block 380. TEQ 370 asserts a SYMBOL indication to mark the end of a DMT symbol only after dropping the sixteen filter results when in cyclic prefix mode. If not in cyclic prefix mode, TEQ 370 still writes only 256 results out, but then TEQ 370 immediately issues the SYMBOL indication, without waiting sixteen more samples.

Rx magnitude block 364 performs or applies automatic gain control (AGC) measurements and scales the samples for Rx gain. Rx magnitude block 364 then applies the Rx gain and writes the results in an input buffer 382 of FFT block 380 so that the transformed time domain values have a suitable range.

FFT block 380 includes input buffer 382, a computation buffer 384, an FFT engine 386, and a timing circuit 388. Input buffer 382 stores the filtered input samples and is a (conceptual) double buffer with a capacity to store at least two DMT symbols for burst processing. FFT engine 386 performs a fast Fourier transform to convert the samples from the time domain to the frequency domain. FFT engine 386 uses an "in-place" computation method in order to save buffers. "In-place" means that for each butterfly operation, the FFT uses a pair of input samples from buffer 382 and uses the same two spots to store the sum and difference. Timing circuit 388 shifts the samples (according to a SW command specification) to adjust the frame boundaries before FFT engine 386 performs an FFT.

The input samples are real numbers, but the output Fourier coefficients from FFT engine 386 are complex. Accordingly, computation buffer 384 has storage for complex values. In the exemplary embodiment, the size of computation buffer 384 is 256×48 bits. Since the input samples are real, the imaginary parts are zero when transferring the real samples from input buffer 382 to computation buffer 384. Also, since storage for the real component in computation buffer 384 is wider than the width of input buffer 382, and each input sample is left aligned in the fractional format.

FFT engine 386 can start to read buffer 382 for a burst before TEQ 370 has filled buffer 382. FFT engine 386 starts at the lower addresses while TEQ 370 finishes filling buffer 382. TEQ 370 wraps write addresses back to the low address just before FFT engine 386 reads the last entries from buffer 382. Timing block 388 determines when FFT engine 386 can begin reading samples from input buffer 382.

FFT engine 386 operates on complex values in computation buffer 384 to perform the fast Fourier transform. The core FFT can be simplified because half of the input values (i.e., the imaginary parts of the input samples) are zero. FFT engine 386 can perform, a 128 point FFT with some overhead processing instead of a 256 point FFT. Once the FFT is complete, FFT engine 386 rounds and clips the required output points into the required "window", since the result is once again 16-bit only. Rounding and clipping is only required for 128 lower complex output points because for an FFT of real numbers, the upper complex points are complex conjugate of the lower ones. FFT engine 386 can implement different FFT algorithms. For example, in a linear case the input samples to the FFT engine 386 are in order whereas in a bit reversed case, the inputs to the FFT block follow a predetermined pattern and not in order. That is accomplished while copying input buffer 382 into computation buffer 384. Also, FFT engine 386 shifts the result by one bit to maximize accuracy and avoid overflows. The FFT latency is a little bit over one quarter of the DMT symbol time. To achieve this latency, FFT engine 386 has four multipliers and accumulators working in parallel and a simple finite state matching (not shown) that controls the FFT engine 386. However, the details of the implementation of the FFT engine 386 is not critical to the invention, and any FFT hardware can be used.

Sine/cosine table 342 couples to both FFT engine 386 and IDFT engine 354 and has 128 entries to satisfy the FFT resolution. The IDFT resolution is 32 for G.992.2. Accordingly, the required sine and cosine values for IDFT engine 414 are a subset of the values required for FFT engine 386, and the two least significant address bits from IDFT engine 414 are zero to select the correct values from sine/cosine table 342. Sine/cosine table 342 can be implemented in a variety of ways including ROM, RAM to which the host downloads values, or a hard-wired table with an output multiplexer. Using a hardwired table, the output multiplexer becomes two reduced multiplexers: a 32-to-1 multiplexer for IDFT engine 354 and a 128-to-1 multiplexer for FFT engine 386.

There are four different programmable tone detectors 368 used primarily for initialization procedures. To save hardware, accelerator 340 has only one power calculator to calculate the power of the tones. Four different accumulators provide the power calculator with input values, and latch output values from the power calculator one at a time. The host can read the accumulators. Four comparators compare the address being transferred from the FFT computation buffer 384 to Rx buffer 334 with the each of the four pre-programmed addresses (or channel indices). Whenever one of them is matched, the appropriate accumulator is selected, and the data is routed to the tone power calculator. Each of the four tone detectors 368 has a counter that counts the number of consecutive threshold crossings. Each time that the threshold has not been crossed, the appropriate counter is set to a beginning programmable value. Once again, one shared incrementer/zero-comparator and four different registers together constitute the four counters. The tone detectors' operation is normally triggered four times every DMT symbol time, when the channel index of the data being transferred from FFT to G.992.2 Rx buffer 334 matches one of the four pre-programmed tone indices.

Although the invention has been described with reference to particular embodiments, the description is only an example of the invention's application and should not be taken as a limitation. In particular, even though much of preceding discussion was aimed at the G.992.2 standard, alternative embodiments of this invention include other standards including but not limited to G.992.1, HDSL, and VDSL. Various other adaptations and combinations of features of the embodiments disclosed are within the scope of the invention as defined by the following claims.

I claim:

1. A communication system comprising:
    a first interface for connection to a communication channel;
    receiver hardware coupled to receive via the first interface, time domain samples of a received signal from the communication channel, wherein the received signal is in compliance with a discrete multi-tone (DMT) protocol, wherein the receiver hardware transforms the samples to generate frequency domain coefficients of a portion of the received signal, wherein the receiver hardware partially decodes the received signal by determining coefficients corresponding to sub-channels defined by the DMT protocol; and
    a second interface for connection to a host computer, the second interface being connected to the receiver hardware for transfers of the coefficients from the receiver hardware to the host computer for further processing by the host computer,
    wherein a program executed by the host computer completes decoding of the received signal in accordance with the DMT protocol.

2. The system of claim 1, further comprising transmitter hardware coupled to receive from the host computer, frequency domain coefficients of a transmitted signal, wherein the transmitter hardware transforms the frequency domain coefficients of the transmitted signal to time domain samples of the transmitted signal.

3. The system of claim 1, wherein the receiver hardware further comprises an equalizer that performs a filter operation on the time domain samples before the receiver hardware converts the time domain samples to the frequency domain coefficients.

4. The system of claim 1, wherein the first interface, the receiver hardware, and the second interface are included on a device for connection to a device bus of the host computer.

5. A communication system comprising:
    a first interface for connection to a communication channel;
    receiver hardware coupled to receive via the first interface, time domain samples of a received signal from the communication channel, wherein the receiver hardware transforms the samples to generate frequency domain coefficients of a portion of the received signal; and
    a second interface for connection to a host computer, the second interface being connected to the receiver hardware for transfers of the coefficients from the receiver hardware to the host computer for further processing by the host computer;
    transmitter hardware coupled to receive from the host computer, frequency domain coefficients of a transmitted signal, wherein the transmitter hardware transforms the frequency domain coefficients of the transmitted signal to time domain samples of the transmitted signal;

wherein the received and transmitted signals are in compliance with a discrete multi-tone (DMT) protocol;

wherein the receiver hardware partially decodes the received signal by determining coefficients corresponding to sub-channels defined by the DMT protocol; and wherein a program executed by the host computer completes decoding of the received signal in accordance with the DMT protocol and partially encodes the transmitted signal by converting data into the frequency domain coefficients of the transmitted signal that are sent to the transmitter hardware for further processing.

6. A communication system comprising:

a host computer which includes a processor, a memory, and a device bus;

a first interface for connection to a communication channel;

receiver hardware coupled to receive via the first interface, time domain samples of a received signal from the communication channel, wherein the receiver hardware transforms the samples to generate frequency domain coefficients of a portion of the received signal; and a second interface for connection to the host computer, the second interface being connected to the receiver hardware for transfers of the coefficients from the receiver hardware to the host computer for further processing by the host computer, wherein the first interface, the receiver hardware, and the second interface are included on a device for connection to a device bus of the host computer, wherein the second interface transfers the coefficients from the device to the memory in the host computer, and wherein the processor executes a program which processes the coefficients to extract data represented by the portion of the received signal.

7. The system of claim 6, wherein:

the received signal is in compliance with a discrete multi-tone (DMT) protocol;

the device partially decodes the received signal by determining coefficients corresponding to sub-channels defined by the DMT protocol; and the program completes decoding of the received signal.

8. The system of claim 7, wherein the program comprises a slicer that compares each coefficient to a constellation for a sub-channel corresponding to the coefficient and identifies in the constellation a symbol that corresponds to the coefficient.

9. The system of claim 8, wherein the program further comprises a deframer that converts each symbol that the slicer identifies to a set of bits corresponding to the symbol and orders the sets of bits to form a data stream.

10. The system of claim 9, wherein the program further comprises a decoder that in accordance with the DMT protocol, performs error detection and error correction on the data stream.

11. The system of claim 7, wherein the portion of the received signal corresponds to a DMT symbol.

12. The system of claim 6, wherein:

the device further comprises transmitter hardware coupled to receive from the host computer, frequency domain coefficients of a transmitted signal; and the transmitter hardware transforms the frequency domain coefficients of the transmitted signal to time domain samples of the transmitted signal.

13. The system of claim 12, wherein:

the receiver hardware performs a fast Fourier transform on the time domain samples of the received signal; and the transmitter hardware performs an inverse discrete Fourier transform on the frequency domain coefficients from the host computer.

14. The system of claim 12, wherein:

the received and transmitted signals are in compliance with a discrete multi-tone (DMT) protocol;

the device partially decodes the received signal by determining coefficients corresponding to sub-channels defined by the DMT protocol and partially encodes the transmitted signal; and the program completes decoding of the received signal.

15. The system of claim 12, further comprising:

an analog-to-digital converter coupled to the first interface, wherein the received signal is an analog signal that the analog-to-digital converter samples to generate the time domain samples of the received signal; and a digital-to-analog converter coupled to the first interface, wherein the digital-to-analog converter converts the samples from the transmitter hardware to the transmitted signal.

16. A process for execution by a host computer, the process comprising:

receiving frequency domain information from receiver hardware attached to the host computer, wherein the receiver hardware receives a received communication signal from a communication channel and derives the frequency domain information from the received communication signal;

processing the frequency domain information in accordance with a communication protocol to extract data;

directing the data to a user;

receiving data from the user;

processing the data in accordance with the communication protocol to generate frequency domain information for a portion of a transmitted communication signal; and sending the frequency domain information to transmitter hardware for conversion of the frequency domain information to time domain information and generation of the portion of the transmitted signal from the time domain information.

17. The process of claim 16, wherein processing the data comprises:

breaking the data into bit sets with each bit set corresponding to a sub-channel in the transmitted signal; and encoding each bit set as a symbol selected from a constellation for the sub-channel corresponding to the bit set, the symbol identifying a frequency domain coefficient for the sub-channel.

18. The process of claim 16, wherein the communication protocol employs discrete multi-tone modulation, and the received communication signal is in compliance with the communication protocol.

19. The process of claim 16, wherein processing the frequency domain information comprises:

extracting from the frequency domain information a set of coefficients, each coefficient corresponding to a sub-channel of the received communication signal;

slicing each coefficient to identify a symbol corresponding to the coefficient;

determining for each symbol, a bit set corresponding to the symbol; and assembling the bit sets in an order defined by the communication protocol to construct a bit stream.

20. The process of claim 19, wherein extracting comprises filtering the frequency domain information to perform frequency domain equalization.

21. The process of claim 19, wherein the processing further comprises checking the bit stream for errors wherein the checking uses codes that are in the bit stream and defined by the communication protocol.

* * * * *